US010993260B2

(12) United States Patent
Siomina et al.

(10) Patent No.: US 10,993,260 B2
(45) Date of Patent: Apr. 27, 2021

(54) METHOD FOR CONTROLLING LBT IN A DISTRIBUTED SYSTEM

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/092,601

(22) PCT Filed: Aug. 22, 2016

(86) PCT No.: PCT/SE2016/050781
§ 371 (c)(1),
(2) Date: Oct. 10, 2018

(87) PCT Pub. No.: WO2017/180035
PCT Pub. Date: Oct. 19, 2017

(65) Prior Publication Data
US 2019/0174539 A1    Jun. 6, 2019

Related U.S. Application Data

(60) Provisional application No. 62/320,778, filed on Apr. 11, 2016.

(51) Int. Cl.
*H04W 76/45* (2018.01)
*H04W 74/08* (2009.01)
(Continued)

(52) U.S. Cl.
CPC ......... *H04W 74/0808* (2013.01); *H04W 4/10* (2013.01); *H04W 28/16* (2013.01);
(Continued)

(58) Field of Classification Search
CPC ....... H04W 4/10; H04W 76/45; H04W 72/12; H04W 72/1226
See application file for complete search history.

(56) References Cited

U.S. PATENT DOCUMENTS

2015/0098397 A1    4/2015  Damnjanovic et al.
2015/0146680 A1*   5/2015  Luo ................. H04B 7/0452
                                                    370/330
(Continued)

FOREIGN PATENT DOCUMENTS

WO        2015076938 A1    5/2015

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.1.0, 3GPP Organizational Partners, Mar. 2016, 155 pages.
Nokia Networks, "R1-157130: On LAA DL LBT design enabling frequency reuse," Third Generation Partnership Project (3GPP), TSG RAN WG1 Meeting #83, Nov. 15-22, 2015, 5 pages, Anaheim, USA.
(Continued)

*Primary Examiner* — Salvador E Rivas
(74) *Attorney, Agent, or Firm* — Christopher & Weisberg, P.A.

(57) ABSTRACT

The present disclosure relates to a method performed in a network node of a communication network, for facilitating downlink transmission in a shared cell served by a group of at least one Listen Before Talk (LBT) capable Transmission Point (TP). The method comprises determining, for each TP of the group, whether an LBT procedure is to be performed before signal transmission by said TP. The method also comprises, based on the determining, controlling the use of LBT procedures in the shared cell.

23 Claims, 1 Drawing Sheet

(51) Int. Cl.
H04W 72/12 (2009.01)
H04W 28/16 (2009.01)
H04W 4/10 (2009.01)
H04W 48/16 (2009.01)
H04W 88/08 (2009.01)

(52) U.S. Cl.
CPC ........... *H04W 48/16* (2013.01); *H04W 72/12* (2013.01); *H04W 72/1273* (2013.01); *H04W 76/45* (2018.02); *H04W 72/1226* (2013.01); *H04W 88/085* (2013.01)

(56) References Cited

U.S. PATENT DOCUMENTS

| | | |
|---|---|---|
| 2016/0029407 A1 | 1/2016 | Soldati et al. |
| 2016/0066291 A1* | 3/2016 | Awad ................ H04W 56/0015 370/350 |
| 2017/0215205 A1* | 7/2017 | Takeda .................. H04B 15/00 |
| 2018/0139767 A1* | 5/2018 | Lee .................. H04W 72/1289 |

OTHER PUBLICATIONS

International Search Report and Written Opinion for International Patent Application No. PCT/SE2016/050781, dated Jan. 2, 2017, 12 pages.

\* cited by examiner

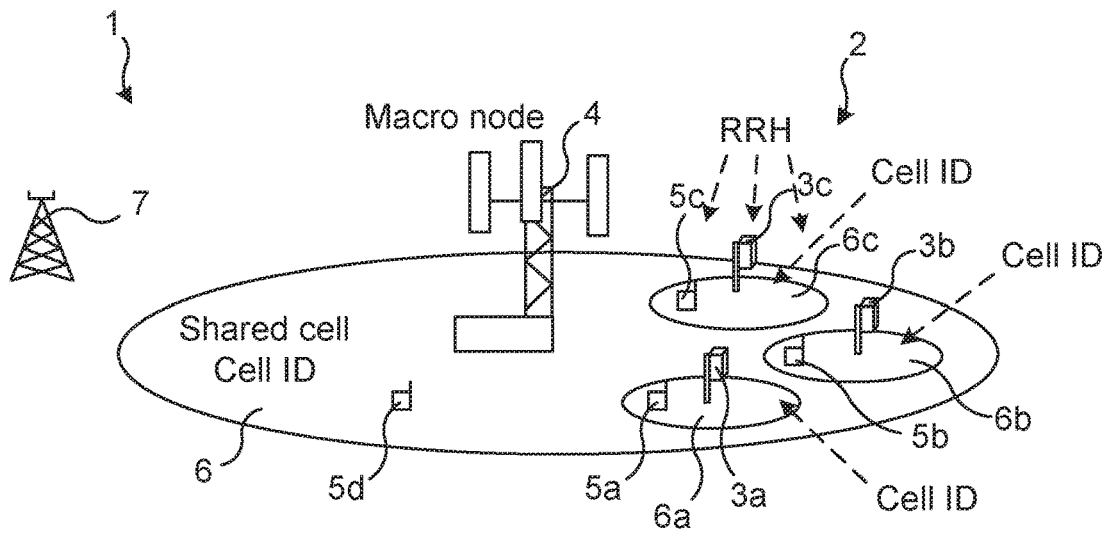
Fig. 1
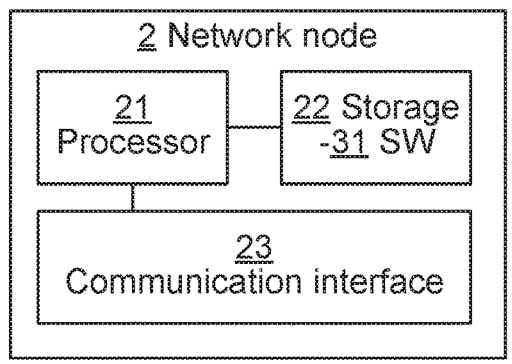
Fig. 2a
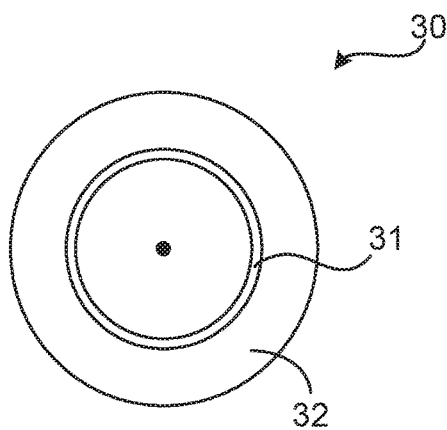
Fig. 3
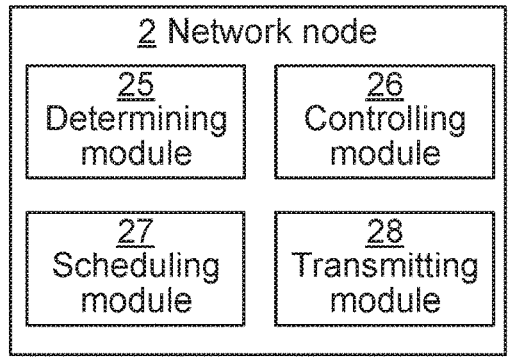
Fig. 2b
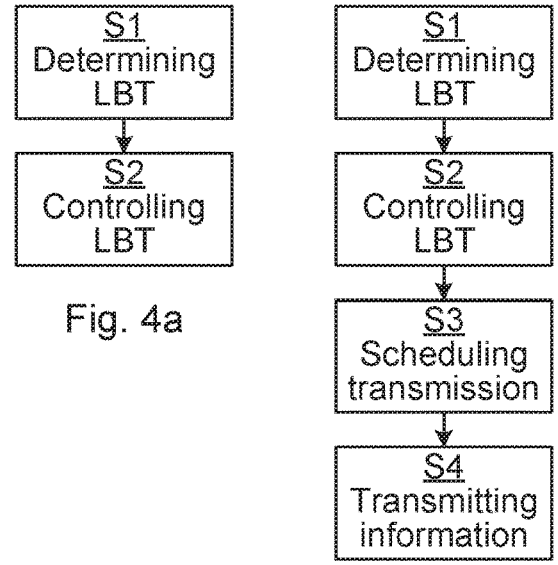
Fig. 4a
Fig. 4b

METHOD FOR CONTROLLING LBT IN A DISTRIBUTED SYSTEM

This application is a 35 U.S.C. § 371 national phase filing of International Application No. PCT/SE2016/050781, filed Aug. 22, 2016, which claims the benefit of U.S. Provisional Application No. 62/320,778, filed Apr. 11, 2016, the disclosures of which are incorporated herein by reference in their entireties.

TECHNICAL FIELD

The present disclosure relates to methods performed in a network node of a communication network, for facilitating downlink transmission in a shared cell 6.

BACKGROUND

LAA. Unlicensed Spectrum, and Frame Structure Type 3 (FS3)

License Assisted Access (LAA) or operation based on frame structure type 3 (the frame structure type 3 is specified in the Third Generation Partnership Project (3GPP) Technical Specification (TS) 36.211), which was introduced in Long Term Evolution (LTE) Release 13 (Rel-13), refers to the User Equipment (UE) operation on at least one carrier in unlicensed spectrum such as Band 46 also used for Wireless Local Area Network (WLAN). e.g. WiFi, access. For instance, a UE can be configured with carrier aggregation with the Primary Cell (PCell) in Band 1 (licensed spectrum) and Secondary Cell (SCell) in Band 46 (unlicensed spectrum). An evolved Node B (eNB) operating in the unlicensed band only transmits signals which may be used for UE measurements using so called Discovery Reference Symbols/Signal (DRS). Unlike release 8 CRS (Common Reference Symbols), DRS is not transmitted in every subframe, and is instead transmitted periodically (e.g. every 160 milliseconds, ms). Moreover, the eNB may perform so called Listen Before Talk (LBT) procedures to check that no other node (such as another eNB or a WiFi access point, AP) is transmitting in the unlicensed spectrum before it transmits DRS. This means that from a UE perspective, the eNB may be unable to transmit any particular DRS transmission. In certain regions, LBT functionality is required from a regulatory point of view to ensure fair coexistence of different radios and access technologies on the unlicensed band.

In LTE Rel-14, in addition to the Downlink (DL) operation in the unlicensed spectrum as described above, also Uplink (UL) operation is being introduced. This means that a UE may be configured with UL transmissions on one or more SCells in the unlicensed spectrum and perform UL LBT if needed.

Listen-Before-Talk

According to the LBT procedure, the transmitter in unlicensed spectrum (e.g. comprised in a base station in case of DL or the user terminal or UE in case of UL) needs to listen on the carrier before it starts to transmit. If the medium is free the transmitter can transmit (referred sometimes as LBT being successful). If the medium is busy, e.g. if some other node is transmitting, the transmitter cannot transmit (referred sometimes as LBT being unsuccessful or fails) and the transmitter can try again at a later time. Therefore, the LBT procedure enables a Clear Channel Assessment (CCA) check before using the channel. Based on the CCA, if the channel is found to be clear then then LBT is considered to be successful. But if the channel is found to be occupied then the LBT is considered to be failure also known as LBT failure. The LBT failure requires the network node not to transmit signals in the same and/or subsequent subframes. Exact subframes and also the number of subframes where transmission is forbidden depends on specific design of LBT scheme.

Due to LBT, a transmission in an unlicensed band may be delayed until the medium becomes free again. And in case there is no coordination between the transmitting nodes (which often is the case) the delay may appear random.

In a simple form, LBT is performed periodically with a period equal to certain units of time. As an example, one unit of time duration i.e. one Transmission Time Interval (TTI), one time slot, one subframe etc. The duration of listening in LBT is typically in the order of few to tens of microseconds (μs). Typically for LBT purpose, each LTE subframe is divided into two parts. In the first part, the listening takes place, and the second part carries data if the channel is seen to be free. The listening occurs at the beginning of the current subframe and determines whether or not data transmission will continue in this subframe and a few next subframes. Hence, the data transmission in a subframe P until subframe P+n is determined by the outcome of listening during the beginning of subframe P. The number n depends on system design and/or regulatory requirements.

Shared Cell Deployments

A shared cell is a type of downlink Coordinated Multi-Point (CoMP) where multiple geographically separated Transmission Points (TPs) dynamically coordinate their transmission towards the UE. A unique feature of a shared cell is that all transmission points within the shared cell have the same Physical Cell Identifier/ID (PCI). This means that the UE cannot distinguish between the TPs by the virtue of the PCI decoding. The PCI is acquired during a measurement procedure e.g. cell identification etc. A TP may comprise one or more antenna ports. The TP can be uniquely identified by a unique identifier also known as TP ID.

The shared cell approach can be implemented by distributing the same cell specific signals on all points (within the macro point coverage area). With such a strategy, the same physical signals such as Primary Synchronization Signals (PSS), Secondary Synchronization Signals (SSS), Cell Specific Reference Signals (CRS), Positioning Reference Signal (PRS) etc. and the same physical channels such as Physical Broadcast Channel (PBCH), Physical Downlink Shared Channel (PDSCH) containing paging and System Information Blocks (SIBs), control channels (Physical Downlink Control Channel (PDCCH), Physical Control Format Indicator Channel (PCFICH), Physical channel Hybrid-ARQ Indicator Channel (PHICH) etc.) are transmitted from each TP in the DL. Tight synchronization in terms of transmission timings between the TPs within a shared channel is used e.g. in order of ±100 nanoseconds (ns) between any pair of nodes. This enables the physical signals and channels transmitted from M points to be combined over air. The combining is similar to what is encountered in Single-Frequency Networks (SFN) for broadcast.

Each TP may also be configured to transmit Channel State Information Reference Signal (CSI-RS) signals which are unique to each TP. Therefore the CSI-RS enables the UE to uniquely identify a TP within a shared cell. The UE may also use the CSI-RS for performing measurement (e.g. CSI-RSRP. Reference Signal Received Power) which in turn enables the UE to determine the strongest TP within a shared cell.

Cell Portion

A TP may be associated with a cell portion. A cell portion is a geographical part of a cell, e.g. shared cell. A cell portion is semi-static and identical for both the UL and the DL.

Within a cell, a cell portion may be uniquely identified by its Cell Portion ID. TP ID and cell portion ID may be interchangeably used.

SUMMARY

A problem identified with the prior art is that different transmission points within the same shared cell may have quite different locations and/or also operate in very different radio conditions (e.g., one transmission point may operate under strong interference conditions while another one under moderate or low interference) and environments (e.g., indoor and outdoor) or experience different loads (e.g., depending on geographical UE locations there may be more active UEs closer to one TP and no UEs within the coverage of another TP). Therefore, always applying LBT on all TPs at the same time may be not efficient and may even unnecessarily contribute to higher interference.

It is an objective of embodiments of the present disclosure to alleviate the identified problem.

According to an aspect of the present disclosure, there is provided a method performed in a network node of a communication network, for facilitating downlink transmission in a shared cell served by a group of at least one LBT-capable TP 3. The method comprises determining, for each TP of the group, whether an LBT procedure is to be performed before signal transmission by said TP. The method also comprises, based on the determining, controlling the use of LBT procedures in the shared cell.

According to another aspect of the present disclosure, there is provided a computer program product comprising computer-executable components for causing a network node to perform an embodiment of a method of the present disclosure when the computer-executable components are run on processor circuitry comprised in the network node.

According to another aspect of the present disclosure, there is provided a network node for a communication network configured for facilitating downlink transmission in a shared cell served by a group of at least one LBT-capable TP. The network node comprises processor circuitry, and storage storing instructions executable by said processor circuitry whereby said network node is operative to determine, for each TP of the group, whether an LBT procedure is to be performed before signal transmission by said TP. The network node is also operable to, based on the determining, control the use of LBT procedures in the shared cell.

According to another aspect of the present disclosure, there is provided a method performed in an LBT-capable TP serving a shared cell of a communication network, for facilitating downlink transmission in said shared cell. The method comprises receiving instructions to perform an LBT procedure, the instructions being addressed to the TP.

According to another aspect of the present disclosure, there is provided a computer program product comprising computer-executable components for causing a TP to perform an embodiment of a method of the present disclosure when the computer-executable components are run on processor circuitry comprised in the TP.

According to another aspect of the present disclosure, there is provided an LBT-capable TP for serving a shared cell of a communication network, for facilitating downlink transmission in said shared cell. The TP comprises processor circuitry, and storage storing instructions executable by said processor circuitry whereby said TP is operative to receive instructions to perform an LBT procedure, the instructions being addressed to the TP. e.g. by means of an identifier of the TP, e.g. a TP ID.

According to another aspect of the present disclosure, there is provided a computer program for facilitating downlink transmission in a shared cell served by a group of at least one LBT-capable TP. The computer program comprises computer program code which is able to, when run on processor circuitry of a network node, cause the network node to determine, for each TP of the group, whether an LBT procedure is to be performed before signal transmission by said TP. The code is also able to cause the network node to, based on the determining, control the use of LBT procedures in the shared cell.

Advantages of embodiments of the present disclosure comprise a possibility to control scheduling in shared cell in presence of LBT, as well as that the behavior of transmissions of signals in a shared cell when LBT is performed on different TPs is more well defined.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, on which:

FIG. 1 is a schematic illustration of an embodiment of a communication network in accordance with the present disclosure;

FIG. 2a is a schematic block diagram of an embodiment of a network node of the present disclosure;

FIG. 2b is a schematic functional block diagram of an embodiment of a network node of the present disclosure;

FIG. 3 is a schematic illustration of an embodiment of a computer program product of the present disclosure:

FIG. 4a is a schematic flow chart of an embodiment of a method of the present disclosure; and FIG. 4b is a schematic flow chart of another embodiment of a method of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Any two or more embodiments described in this document may be combined in any way with each other. Furthermore, even though the examples herein are given in the LAA context, the embodiments described herein are not limited to LAA. The described embodiments are not limited to LTE either, but can be adapted in other RATs too, e.g., UTRA, LTE-Advanced, 5G, NX, NB-IoT, WiFi, BlueTooth, etc.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, tablet computer, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc.

In some embodiments the generic terminology Primary Serving Cell (PCell), Primary Secondary Cell (PSCcll) and Secondary (Serving) Cell (SCell). These terms may refer to different types of serving cells which a certain UE is configured to use. Other terms which may be used for these terms are Primary Component Carrier (PCC), Primary Secondary Component Carrier (PSCC), Secondary Component Carrier (SCC), respectively.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

In Dual Connectivity (DC) operation the UE can be served by at least two nodes called master eNB (MeNB) and secondary eNB (SeNB). More generally in multiple connectivity (aka multi-connectivity) operation the UE can be served by two or more nodes e.g. MeNB, SeNB1, SeNB2 and so on. The UE is configured with PCC from both MeNB and SeNB. The PCell from MeNB and SeNB are called as PCell and PSCell respectively. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures e.g. radio link monitoring (RLM), DRX cycle etc on their PCell and PSCell respectively. The methods and embodiments are applicable to both CA, DC and Multi-Connectivity (MC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "DRS" or discover (or discovery) signal may comprise of any type of reference signal, which can be used by the UE for performing one or more measurements. Examples of DRS are CRS. CSI-RS, PSS, SSS, Multicast-broadcast single-frequency network (MBSFN) RS etc. One or more DRS may be transmitted in the same DRS time resource. Examples of DRS time resource are symbol, subframe, slot etc.

The term "measurement" herein refers to radio measurements. Some examples of the radio measurements are: DRS or discovery signal measurement, RSSI measurement, channel occupancy measurement, WiFi RSSI measurement, signal strength or signal power measurements (e.g., RSRP or CSI-RSRP), signal quality measurements (e.g., RSRQ, SINR), timing measurements (e.g., Rx-Tx. Reference Signal Time Difference (RSTD), Round-Trip Time (RTT), Time of Arrival (TOA)), radio link monitoring measurements (RLM), CSI, Precoding Matrix Indicator (PMI), cell detection, cell identification, number of successful reports, number of acknowledgements (ACKs) and/or negative acknowledgements (NACKs), failure rate, error rate, correct system information reading, etc. The measurements may be absolute or relative (e.g., absolute RSRP and relative RSRP). The measurements may be performed for one or more different purpose, e.g., Radio Resource Management (RRM), self-optimizing network (SON), positioning. Minimization of Drive Tests (MDT), etc. The measurements may be, e.g., intra-frequency measurements, inter-frequency measurements, or CA measurements. The measurements may be performed in the licensed and/or unlicensed spectrum. The measurements or measurement reporting may be single measurements, periodic or aperiodic, event-triggered, logged measurements, etc. The measurements may be uni-directional, e.g., DL measurement or UL measurements, or bidirectional, e.g., Rx-Tx or RTI.

The term "radio signal" used herein may refer e.g. to one or more of: reference signal (e.g., CRS, CSI-RS, MBSFN RS, PRS, cell-specific reference signal, UE-specific reference signal, CSI-RS), synchronization signal (e.g., PSS, SSS, etc.), radio channel (e.g., control channel, broadcast or multicast channel, etc.), discovery or DRS signal, etc.

The term "LBT" used herein may correspond to any type of Carrier Sense Multiple Access (CSMA) procedure or mechanism which is performed by the node on a carrier before deciding to transmit signals on that carrier. CSMA or LBT may also interchangeably be called clear channel assessment, clear channel determination etc.

The term "time resource" used herein may correspond to any type of physical resource or radio resource expressed in terms of length of time. Examples of time resources are: symbol, time slot, subframe, radio frame, TTI, interleaving time etc.

The term "shared cell" is interchangeably used with other similar terms such as CoMP cluster with common cell ID, cluster cell with common cell ID, combined cell, a cell with multiple RRHs, RRU, distributed antenna system (DAS), heterogeneous network with shared cell ID, etc. Similarly the term transmission point is also interchangeably used with other similar terms such as radio nodes, radio network nodes, base station, RRH, radio units, remote antenna, etc. All of them bear the same meaning. For consistency the term shared cell which is also more generic is used in the invention disclosure. Furthermore the term transmission point (TP) for individual nodes within a shared cell is also used for consistency. The term distributed system used herein may refer to a system operating at least one shared cell.

FIG. 1 illustrates an embodiment of a communication network 1 comprising a network node 2, e.g. a Radio Access Network (RAN) node, here in the form of a base station e.g. an eNB, as well as another network node 7, e.g. a neighboring base station/eNB. The base station 2 may be a macro node and comprises a macro point 4 and a plurality of TPs 3, here three TPs 3a, 3b and 3c are shown as an example. Together, the macro point 4 and the TPs 3 serve a shared cell 6 of the base station 2, the shared cell having the a Cell ID which is the same for the macro point 4 and the TPs 3. Each of the TPs comprises a Remote Radio Head (RRH) and serves a cell section 6a, 6b and 6c, respectively. Wireless devices/terminals 5 such as UEs served by the shared cell 6, may be connected directly to the macro point 4 (in the case of 5d) or via any of the TPs 3 (in the cases of 5a, 5b and 5c).

FIG. 2a is a block diagram of an embodiment of a network node 2 of the present disclosure. The hardware illustrated as comprised in the network node may e.g. be comprised in the macro point 4, any of the TPs 3 or elsewhere, or a combination thereof, in the network node in the form of a base station. The network node 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 31 (see also FIG. 3) stored in a storage 22 of one or several storage unit(s) e.g. a memory. The storage unit is regarded as a computer readable means 32 (see FIG. 3) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The network node 2 also comprises a communication interface 23, e.g. for internal communication within the network node 2 such as between a central part of the network node. e.g. the macro point 4, and the TPs 3, and/or for communication with other nodes 7 of the communication network 1.

In accordance with embodiments of the methods described herein. LBT is performed on a subset of TPs 3 within the same shared cell 6.

Methods in a network node 2 for controlling LBT in a distributed system/shared cell 6, may comprise the steps of:

Step 0 (optional): Receiving from another node 7 a request or an indication for the need to perform LBT on a subset of TPs 3.

Step 1: Determining the need to perform LBT for at least one TP 3 associated within the shared cell 6.

Step 1a (optional): Selecting one or more TPs 3 for a transmission, based at least on the determining result of step 1.

Step 1b (optional): Determining whether LBT is to be performed on all, some or no TP 3 within the same shared cell 6.

Step 2: Controlling the LBT within the shared cell 6, based on the determined need in step 1.

Step 2a (optional): The controlling of step 2 may further comprise instructing one or more TPs 3 to perform LBT.

Step 3 (optional): Indicating to at least one other node 7 the network node's ability to perform LBT on a subset of TPs 3 in a shared cell 6.

Step 4 (optional): Indicating to at least one other node 7 whether LBT may be or is performed on a subset of TPs 3 in a shared cell 6.

Step 5 (optional): Using the results of controlled LBTs, e.g. LBT failure or success.

The order of the steps above may be different than presented.

Step 0

According to this step, the network node 2 may receive from another node (e.g., another network node 7 or UE 5) a request or an indication for the need to perform LBT on a subset of TPs 3, the subset comprising at least one TP.

The received request or indication may further comprise the subset of TPs.

Step 1

According to this step, the network node 2 is determining the need to perform LBT for at least one TP 3 associated with the shared cell 6.

The determining may be based on a pre-defined rule, UE 5 measurements, network measurements, history or historical data. The determining may be triggered by an event, condition, or a request or indication received from another node (UE 5 or another network node 7).

In one embodiment, the determining may be performed for a subset of TPs of all the TPs 3 comprised in the network node 2. In one example, the determining may be performed for a known subset of TPs or may comprise determining the subset of TPs for which the need to perform LBT is to be determined.

In another embodiment, the determining may be performed for all TPs 3 in the shared cell 6, but individually per TP.

In yet another embodiment (Step 1a), selecting a subset of transmitting TPs 3 may be based on the result of determining, e.g., if it is determined that a TP is operating in unlicensed spectrum and the probability of accessing the channel in the TP area is high, the TP may be included in the subset of transmitting TPs of the shared cell 6, otherwise the TP may be not used for the transmission.

In yet another embodiment (Step 1b), the determining may further comprise determining whether LBT is to be performed on all, some or no TP 3 within the same shared cell 6. In one example, the network node 2 may select its operation mode among at least two of the operation modes (LBT on all, some, or no TP).

The determining may further comprise determining of one or more of:

the TP 3 operates in unlicensed spectrum and/or under frame structure type 3 and there is a need to transmit at least one radio signal or channel within the shared cell from at least one TP (so, there is a need to perform LBT), there is a pending, scheduled or configured transmission for at least one TP 3 and the channel access needs to be obtained prior to the transmission (so, there is a need to perform LBT), there is a need to perform LBT within a certain time interval T or not later than time t.

there is a need to perform LBT to access the channel for at least time T_access, the channel occupancy in the TP area (cell portion), e.g., if the channel occupancy is above a threshold there may be no need to perform LBT for this TP, presence of at least one UE 5 in the TP area, e.g., based on measurements or UE location (e.g., if there is at least one UE there may be a need to perform LBT for this TP 3), determining the activity state (e.g., IDLE or CONNECTED; low activity or high activity; no Discontinuous Reception (DRX), short DRX, long DRX, or eDRX) of at least one UE 5 in the TP area (e.g., there may be no need for the TP to have the channel access more frequently and/or for a longer time than it is needed with respect to the UE activity state), probability of LBT success and/or LBT failure in the TP area (e.g., if the success probability is above a threshold it may be worth attempting to get the channel in the TP area and the LBT is thus needed), radio conditions in the TP area (e.g., signal quality, interference and/or noise level) (e.g., if the radio conditions are good it may be worth to attempt to access the channel and the LBT is thus needed), TP priority (e.g., there may be no need to perform LBT on high priority TPs i.e. always transmit without LBT).

geographical location of TPs 3. For example a first TP1 which is geographically far (e.g. distance larger than threshold with respect to serving TP) from the serving TP0 (e.g. eNB) performs LBT. But a second TP2 which is close to the serving TP0 (e.g. eNB) does not perform LBT. In this case TP2 may use the results of the outcome of LBT in TP0 for deciding whether to transmit signal or not in the next time resources. For example if LBT is successful in TP0 then LBT is also considered to be successful in TP2. But TP1 independently performs the LBT and decides based on its LBT whether the LBT is successful or not.

Step 2

According to this step, the network node 2 performs controlling the LBT within the shared cell, based on the determined need.

The controlling of the LBT may further comprise performing LBT on a subset of TPs at a time within the shared cell, wherein the subset may comprise one or more TPs 3.

The controlling may further comprise instructing one or more TPs to perform LBT (Step 2a).

The controlling of the LBT may further comprise (re) scheduling of LBT for at least one TP 3.

The controlling may also comprise (re)scheduling of LBT at different times for two different TPs in the same shared cell 6. In one example, the non-parallel LBT at different TPs may be performed in a round robin manner among the TPs.

The controlling of the LBT may also be based on some priorities associated with TPs 3, e.g., performing LBT always when it was determined to be needed at higher-priority TPs or for higher-priority transmissions.

The controlling may further comprise (re)scheduling of at least one signal and/or channel transmission to align with the LBT scheduling. For example, if the LBT may be performed not in parallel but in sequence for at least two TPs, the data scheduling may be adjusted accordingly.

The controlling may be based on a pre-defined rule, scheduling, etc.

Step 3

According to this step, the network node 2 may be indicating to at least one other node (e.g., UE 5 or another network node 7) the network node's ability to perform LBT on a subset of TPs 3 in a shared cell 6.

In one example, the indicating may comprise sending a message indicative of the network node's capability associated with its ability to perform LBT on a subset of TPs 3 within a shared cell 6.

The indicating may be via radio or fixed interface.

The indicating may be via a third node (e.g., UE 5 or another network node 7), e.g., transparent to the third node or forwarded/resending by the third node.

The indicating may be by means of unicast, multicast, or broadcast transmission.

Step 4

According to this step, the network node 2 is indicating to at least one other node 7 whether LBT may be or is performed on a subset of TPs, no TPs, or all TPs in a shared cell 6.

The indication may also comprise the subset of TPs 3 for which the LBT is performed.

The indication may also comprise an indication of whether the LBT is performed on more than one TP at a time.

The indication may also comprise an indication from a first TP informing another node (which may also be a TP 3) whether the LBT was successful or not in the first TP in certain time resource. The other node receiving this information may use this for one or more tasks. Examples of tasks are adaptation of scheduling of signals in the first TP etc. For example, if LBT is not successful in the first TP, then the serving TP will not schedule any transmission to any UE 5 in the first TP over the next N time resources i.e. during back-off time period.

The indication may also comprise the result of LBTs on the corresponding TPs 3.

The indication may also comprise a rule or scheduling of LBT associated with individual TPs.

Step 5

According to this step, the network node 2 may use the result(s) of the controlled LBTs for the corresponding TPs 3. The using may be internal in the network node or the result(s) may be signaled to another node (e.g., another network node 7 or a UE 5 or another TP 3 within the same shared cell 6).

In one example, the using may comprise using for scheduling one or more transmissions (unicast, multicast, or broadcast) from the TPs 3 performing the LBT and/or from the TPs using the result of LBT on a reference TP within the same shared cell 6 (e.g., the LBT is performed by one TP but at least one other TP may get access to the channel based on the LBT result of the first TP).

In another example, the using may comprise using for scheduling one or more UL transmission (since UL transmissions may be associated with DL transmissions, e.g., UE feedback).

The results related to the outcome of LBT in one or more TPs can be used by another node (e.g. serving TP 3) for one or more tasks e.g.

In one example the serving TP schedules transmission of signals in one or more TPs in the shared cell 6 provided that the LBT does not fail in more than M number of TPs 3.

In another example the serving TP schedules transmission of signals in one or more TPs in the shared cell provided that the LBT is successful in at least (N−M) number of TPs, where N is total number of TPs in a shared cell and M is the number of TPs where the LBT has failed during certain time resource. The parameter M can be shared-cell specific and/or UE specific (i.e. number of TPs configured for scheduling).

In yet another example the transmission of signals is scheduled only in a default TP or default subset of TPs (e.g., in the serving TP) provided that the LBT has failed in M or more number of TPs in a shared cell 6.

FIG. 2b is a schematic block diagram functionally illustrating an embodiment of the network node 2 in FIG. 2a. As previously mentioned, the processor circuitry 21 may run software 31 for enabling the network node 2 to perform an embodiment of a method of the present disclosure, whereby functional modules may be formed in network node e.g. in the processor circuitry 21 for performing the different steps of the method. These modules are schematically illustrated as blocks within the network node 2. Thus, the network node comprises a determining module 25 for determining, for each TP 3 of the group of LBT-capable TPs, whether an LBT procedure is to be performed before signal transmission by said TP. The network node also comprises a controlling module 26 for, based on the determining, controlling the use of LBT procedures in the shared cell 6. In some embodiments, the network node 2 may also comprise a scheduling module 27 for, based on a result of a performed LBT procedure, scheduling a transmission on the TP 3. In some embodiments, the network node may comprise a transmitting module for transmitting information to another network node 7 in the communication network 1. Such information may e.g. comprise any of information about a result of a performed LBT procedure, information about LBT ability of a TP 3 of the group, and an indication that LBT is performed by a TP 3 of the group. Alternatively, the modules may be formed by hardware, or by a combination of software and hardware.

Thus, according to an aspect of the present disclosure, there is provided a network node 2 for a communication network 1 configured for facilitating downlink transmission in a shared cell 6 served by a group of at least one LBT-capable TP 3. The network node comprises means 25 for determining, for each TP of the group, whether an LBT procedure is to be performed before signal transmission by said TP, and means 26 for, based on the determining, controlling the use of LBT procedures in the shared cell 6.

FIG. 3 illustrates an embodiment of a computer program product 30. The computer program product 30 comprises a computer readable (e.g. non-volatile and/or non-transitory) medium 32 comprising software/computer program 31 in the form of computer-executable components. The computer program 31 may be configured to cause a network node 2, e.g. as discussed herein, to perform an embodiment of a method of the present disclosure. The computer program may be run on the processor circuitry 21 of the network node 2 for causing it to perform the method. The computer program product 30 may e.g. be comprised in a storage unit or memory 22 comprised in the network node 2 and associated with the processor circuitry 21. Alternatively, the computer program product 30 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

FIG. 4a is a flow chart of an embodiment of a method performed in a network node 2 of a communication network 1, for facilitating downlink transmission in a shared cell 6 served by a group of at least one LBT-capable TP 3. The network node determines S1, for each TP 3 of the group, whether an LBT procedure is to be performed before signal transmission by said TP. This determining may e.g. comprise receiving a request from another node 7 in the communication network 1 to perform LBT on one or some of the TPs 3 of the group. Then, the network node controls S2, based on the determining S1, the use of LBT procedures in the shared cell 6.

FIG. 4b is a flow chart of another embodiment of a method performed in a network node 2 of a communication network 1, for facilitating downlink transmission in a shared cell 6 served by a group of at least one LBT-capable TP 3. In addition to the determining S and controlling S2, the network node may in some embodiments, based on a result of a performed LBT procedure, schedule S3 a transmission on a TP 3. In some embodiments, the network node 2 may transmit S4 information to another network node 7 in the communication network 1. Such information may e.g. comprise any of information about a result of a performed LBT procedure, information about LBT ability of a TP 3 of the group, and an indication that LBT is performed by a TP 3 of the group.

Modifications and other variants of the described embodiments will come to mind to one skilled in the art having the benefit of the teachings presented in the foregoing descriptions and the associated drawings. Therefore, it is to be understood that the embodiments are not to be limited to the specific examples disclosed and that modifications and other variants are intended to be included within the scope of this disclosure. Although specific terms may be employed herein, they are used in a generic and descriptive sense only and not for purposes of limitation.

LIST OF ABBREVIATIONS

CA Carrier Aggregation
CC Carrier Component
DRS Discovery Reference Signal
eNB Evolved node B
LAA License assisted access
LBT Listen before talk
LTE Long-Term Evolution
RSRP Reference symbol received power
RSRQ Reference symbol received quality
TP Transmission point

The invention claimed is:
1. A method performed in a network node of a communication network, for facilitating downlink transmission in a shared cell served by a group of Listen Before Talk, LBT, capable Transmission Points, TPs, the method comprising:

determining, for each TP of the group, whether an LBT procedure is to be performed before signal transmission by said TP, wherein the determining comprises two or more of:
  whether at least one of a signal and a channel needs to be transmitted within the shared cell from at least one TP of the group;
  whether at least one TP of the group has one of a pending signal transmission, a scheduled signal transmission, or a configured signal transmission;
  whether a channel access needs to be obtained prior to the signal transmission;
  whether performing the LBT needs to be within a certain time interval;
  whether performing the LBT needs to be not later than a specific time;
  whether performing the LBT needs to access a channel for at least a time period;
  a channel occupancy in an area of the group of LBT-capable TPs;
  presence of at least one wireless device in the area of the group of LBT-capable TPs;
  an activity state of at least one wireless device in the area of the group of LBT-capable TPs;
  a success probability of performing the LBT;
  radio conditions in the area of the group of LBT-capable TPs;
  a priority of at least one TP of the group of LBT-capable TPs; and
  geographical location of the group of LBT-capable TPs; and
based on the determining, controlling LBT procedures in the shared cell, wherein controlling the LBT procedures includes instructing different TPs of the group to perform the LBT procedures in a round robin manner.

2. The method of claim 1, wherein the determining comprises determining the group of LBT-capable TPs as a subset of TPs of all TPs comprised in the network node.

3. The method of claim 2, wherein the TPs included in the subset of TPs are selected to be used for transmitting a signal.

4. The method of claim 3, wherein the signal is a discovery signal.

5. The method of claim 1, wherein the determining comprises determining a TP of the group that is to perform an LBT procedure before transmitting a signal.

6. The method of claim 1, wherein the instructing is performed by addressing an LBT-related communication to specific TPs forming a subset of the TPs in the shared cell.

7. The method of claim 6, wherein the communication comprises TP IDs of the specific TPs.

8. The method of claim 1, further comprising:
based on a result of the performed LBT procedure, scheduling a transmission on one TP.

9. The method of claim 1, further comprising:
transmitting, to another node of the communication network, information about a result of the performed LBT procedure.

10. The method of claim 1, further comprising:
transmitting, to another node of the communication network, information about LBT ability of a TP of the group.

11. The method of claim 1, further comprising:
transmitting, to another node of the communication network, an indication that LBT is performed by a TP of the group.

12. The method of claim 1, wherein the method is performed by a base station and the group of LBT-capable TPs is controllable by the base station.

13. The method of claim 12, wherein the base station is an evolved Node B (eNB).

14. The method of claim 1, wherein controlling the LBT procedures is based on priorities associated with the group of the TPs.

15. The method of claim 1, wherein controlling the LBT procedures further includes scheduling signal transmission for each TP of the group to align with a corresponding LBT scheduling of such TP.

16. The method of claim 1, wherein controlling the LBT procedures further includes instructing the different TPs of the group when to perform the LBT procedures.

17. A network node for a communication network configured for facilitating downlink transmission in a shared cell served by a group of Listen Before Talk, LBT, capable Transmission Points, TPs, the network node comprising:
  processor circuitry; and
  storage storing instructions executable by said processor circuitry whereby said network node is configured to:
    determine, for each TP of the group, whether an LBT procedure is to be performed before signal transmission by said TP, wherein whether the LBT procedure is to be performed before the signal transmission by said TP is determined by two of more of:
      whether at least one of a signal and a channel needs to be transmitted within the shared cell from at least one TP of the group;
      whether at least one TP of the group has one of a pending signal transmission, a scheduled signal transmission, or a configured signal transmission;
      whether a channel access needs to be obtained prior to the signal transmission;
      whether performing the LBT needs to be within a certain time interval;
      whether performing the LBT needs to be not later than a specific time:
      whether performing the LBT needs to access a channel for at least a time period;
      a channel occupancy in an area of the group of LBT-capable TPs;
      presence of at least one wireless device in the area of the group of LBT-capable TPs;
      an activity state of at least one wireless device in the area of the group of LBT-capable TPs;
      a success probability of performing the LBT;
      radio conditions in the area of the group of LBT-capable TPs;
      a priority of at least one TP of the group of LBT-capable TPs; and
      geographical location of the group of LBT-capable TPs; and
    based on the determining, control LBT procedures in the shared cell, wherein controlling the LBT procedures includes instructing different TPs of the group to perform the LBT procedures in a round robin manner.

18. A method performed in a Listen Before Talk, LBT, capable Transmission Point, TP, serving a shared cell of a communication network, for facilitating downlink transmission in said shared cell, the method comprising receiving instructions to perform an LBT procedure, wherein the instructions are addressed to the TP, and include to perform the LBT procedure in a round robin manner.

19. The method of claim 18, wherein the instructions are addressed by means of an identifier of the TP.

20. A Listen Before Talk, LBT, capable Transmission Point, TP, for serving a shared cell of a communication network, for facilitating downlink transmission in said shared cell, the TP comprising:
processor circuitry; and
storage storing instructions executable by said processor circuitry whereby said TP is configured to receive the instructions to perform an LBT procedure, wherein the instructions are addressed to the TP, and include to perform the LBT procedure in a round robin manner.

21. The method of claim 19, wherein the identifier of the TP is a TP ID.

22. The LBT-capable TP of claim 20 wherein the instructions are addressed to the TP by means of an identifier of the TP.

23. The LBT-capable TP of claim 22 wherein the identifier of the TP is a TP ID.

\* \* \* \* \*